United States Patent
Morioka et al.

(10) Patent No.: US 11,627,602 B2
(45) Date of Patent: *Apr. 11, 2023

(54) INFORMATION PROCESSING APPARATUS, COMMUNICATION SYSTEM, INFORMATION PROCESSING METHOD, AND PROGRAM

(71) Applicant: Sony Corporation, Tokyo (JP)

(72) Inventors: Yuichi Morioka, Kanagawa (JP); Shigeru Sugaya, Kanagawa (JP)

(73) Assignee: SONY CORPORATION, Tokyo (JP)

(*) Notice: Subject to any disclaimer, the term of this patent is extended or adjusted under 35 U.S.C. 154(b) by 69 days.

This patent is subject to a terminal disclaimer.

(21) Appl. No.: 17/179,431

(22) Filed: Feb. 19, 2021

(65) Prior Publication Data

US 2021/0176782 A1 Jun. 10, 2021

Related U.S. Application Data

(63) Continuation of application No. 16/074,161, filed as application No. PCT/JP2016/088021 on Dec. 21, 2016, now Pat. No. 10,952,244.

(30) Foreign Application Priority Data

Feb. 25, 2016 (JP) ............... JP2016-034687

(51) Int. Cl.
*H04W 74/04* (2009.01)
*H04W 84/12* (2009.01)
(Continued)

(52) U.S. Cl.
CPC .......... *H04W 74/04* (2013.01); *H04W 48/06* (2013.01); *H04W 48/10* (2013.01); *H04W 84/12* (2013.01); *Y02D 30/70* (2020.08)

(58) Field of Classification Search
CPC ..... H04W 74/04; H04W 48/06; H04W 48/10; H04W 84/12; Y02D 70/00
See application file for complete search history.

(56) References Cited

U.S. PATENT DOCUMENTS 10,492,221 B1 11/2019 Chu et al.
2004/0151146 A1 8/2004 Hammerschmidt
(Continued)

FOREIGN PATENT DOCUMENTS

CN 102334356 A 1/2012
CN 102415008 A 4/2012
(Continued)

OTHER PUBLICATIONS

Extended European Search Report dated Nov. 4, 2020 in European Patent Application No. 20191627.7, 8 pages.
(Continued)

*Primary Examiner* — Ayaz R Sheikh
*Assistant Examiner* — Tarell A Hampton
(74) *Attorney, Agent, or Firm* — Xsensus LLP

(57) ABSTRACT

An information processing apparatus includes a control unit. The control unit controls transmission of an inducement frame for causing another communication device to transmit a transmission suppression period reduction frame for reducing a transmission suppression period. In addition, the control unit controls transmission of the transmission suppression period reduction frame on the basis of the inducement frame in a case where the control unit receives the inducement frame. Transmission suppression periods set in (Continued)

other information processing apparatuses are equally reduced to eliminate inequality in using wireless resources.

11 Claims, 12 Drawing Sheets

(51) Int. Cl.
*H04W 48/06* (2009.01)
*H04W 48/10* (2009.01)

(56) References Cited

U.S. PATENT DOCUMENTS

| | | |
|---|---|---|
| 2005/0249137 A1 | 11/2005 | Todd et al. |
| 2006/0045048 A1 | 3/2006 | Kwon et al. |
| 2006/0291432 A1 | 12/2006 | Xhafa et al. |
| 2007/0115882 A1 | 5/2007 | Wentink |
| 2010/0135268 A1 | 6/2010 | Seok |
| 2012/0327870 A1 | 12/2012 | Grandhi et al. |
| 2014/0010211 A1 | 1/2014 | Asterjadhi et al. |
| 2017/0238310 A1 | 8/2017 | Huang et al. |
| 2018/0213558 A1* | 7/2018 | Kim .................. H04W 74/006 |
| 2018/0376486 A1 | 12/2018 | Ahn et al. |

FOREIGN PATENT DOCUMENTS

| | | |
|---|---|---|
| CN | 103782645 A | 5/2014 |
| EP | 1429494 A1 | 6/2004 |
| EP | 3422792 B1 | 8/2020 |
| GB | 2507278 A | 4/2014 |
| JP | 2009-523371 A | 6/2009 |
| JP | 2010-263493 A | 11/2010 |
| WO | 2007/082229 A2 | 7/2007 |
| WO | 2013/033578 A1 | 3/2013 |

OTHER PUBLICATIONS

Extended Search Report issued in European Application 16891664.1-1215 dated Jan. 4, 2019.
Kim, J., et al., "MU TXOP Truncation", IEEE, 17 Pages total, (Sep. 13, 2015).
International Search Report dated Mar. 14, 2017, in PCT/JP2016/088021, filed Dec. 21, 2016.

* cited by examiner

INFORMATION PROCESSING APPARATUS, COMMUNICATION SYSTEM, INFORMATION PROCESSING METHOD, AND PROGRAM

CROSS-REFERENCE TO RELATED APPLICATIONS

This application is a continuation of U.S. application Ser. No. 16/074,161, filed Jul. 31, 2018, which is based on PCT filing PCT/JP2016/088021, filed Dec. 21, 2016, and claims priority to JP 2016-034687, filed Feb. 25, 2016, the entire contents of each are incorporated herein by reference.

TECHNICAL FIELD

The present technique relates to an information processing apparatus, a communication system, an information processing method, and a program. More specifically, the present technique relates to an information processing apparatus and a communication system that use wireless communication to exchange information, an information processing method in the information processing apparatus and the communication system, and a program causing a computer to execute the method.

BACKGROUND ART

In the past, in a system has been used in an information processing apparatus that uses wireless communication to exchange information (frames), a transmission suppression period for avoiding a collision is set in the communication of the frames between a plurality of information processing apparatuses. For example, an information processing apparatus has been proposed, the information processing apparatus configured to multiplex a plurality of frames by adding opposite direction permission information for permitting frame communication in the opposite direction to each of the plurality of frames and configured to transmit and receive data to and from an information processing apparatus that has received the frame (for example, see PTL 1). In the related art, when the frame provided with the opposite direction permission information is transmitted, the transmission suppression period is set for another information processing apparatus not involved in the transmission and reception of data.

CITATION LIST

Patent Literature

[PTL 1]
JP 2010-263493A

SUMMARY

Technical Problems

In the related art described above, there is a problem that the transmission suppression period set for another information processing apparatus is not reduced in a case where the transmission of data ends early when the time required for the transmission of data is shorter than expected. A system is used to solve the problem, in which the information processing apparatus that has transmitted the data transmits a frame for instructing reduction of the transmission suppression period to the other information processing apparatus to thereby reduce the set transmission suppression period. However, an information processing apparatus that cannot receive the frame for instructing the reduction of the transmission suppression period cannot reduce the transmission suppression period, and the wireless communication is restricted. Therefore, there is a problem of inequality between other information processing apparatuses in using wireless resources.

The present technique has been made in view of the circumstances, and an object of the present technique is to equally reduce transmission suppression periods set in information processing apparatuses to eliminate inequality in using wireless resources.

Solution to Problems

The present technique has been made to solve the problems, and a first aspect of the present technique provides an information processing apparatus, an information processing method of the information processing apparatus, and a program causing a computer to execute the method, the information processing apparatus including a control unit that transmits an inducement frame for causing another communication device to transmit a transmission suppression period reduction frame for reducing a transmission suppression period. This produces an effect that the transmission of the transmission suppression period reduction frame is induced in another communication device.

In addition, in the first aspect, the control unit may transmit the transmission suppression period reduction frame to another communication device after the transmission of the inducement frame. This produces an effect that the transmission suppression period reduction frame is transmitted after the transmission of the inducement frame.

In addition, in the first aspect, the control unit may transmit the transmission suppression period reduction frame in the same configuration as the transmission suppression period reduction frame transmitted after the inducement by the transmitted inducement frame. This produces an effect that the transmission suppression period reduction frames in the same configuration are transmitted from the information processing apparatus and another communication device.

In addition, in the first aspect, the control unit may transmit the transmission suppression period reduction frame at the same time as the transmission suppression period reduction frame transmitted after the inducement by the transmitted inducement frame. This produces an effect that the transmission suppression period reduction frames are transmitted substantially at the same time from the information processing apparatus and another communication device.

In addition, in the first aspect, the control unit may transmit the transmission suppression period reduction frame on the basis of the same transmission rate as the transmission suppression period reduction frame transmitted after the inducement by the transmitted inducement frame. This produces an effect that the transmission suppression period reduction frames are transmitted on the basis of substantially the same transmission rate from the information processing apparatus and another communication device.

In addition, in the first aspect, the control unit may broadcast the inducement frame to a plurality of other information processing apparatuses. This produces an effect that the inducement frame is broadcasted.

In addition, in the first aspect, the control unit may transmit the inducement frame in a case where the control unit first transmits a frame for setting the transmission suppression period in transmission of data in the transmission suppression period. This produces an effect that the inducement frame is transmitted in the case where the transmission suppression period is set.

In addition, in the first aspect, the control unit may control the transmission by adding information included in a trigger frame to the inducement frame. This produces an effect that the inducement frame including the information included in the trigger frame is transmitted.

In addition, a second aspect of the present technique provides an information processing apparatus, an information processing method of the information processing apparatus, and a program causing a computer to execute the method, the information processing apparatus including a control unit that transmits a transmission suppression period reduction frame for reducing a transmission suppression period on the basis of an inducement frame for inducing transmission of the transmission suppression period reduction frame in a case where the control unit receives the inducement frame. This produces an effect that the transmission suppression period reduction frame is transmitted in the case where the inducement frame is received.

In addition, in the second aspect, the control unit may transmit the transmission suppression period reduction frame in a case where the control unit receives the inducement frame from another communication device that has transmitted a frame for setting the transmission suppression period. This produces an effect that the transmission suppression period reduction frame is transmitted in the case where the inducement frame is received from another communication device that has transmitted the frame for setting the transmission suppression period.

In addition, in the second aspect, the control unit may transmit the transmission suppression period reduction frame in a case where the control unit receives the inducement frame including information included in a trigger frame. This produces an effect that the transmission suppression period reduction frame is transmitted in the case where the inducement frame including the information included in the trigger frame is received.

In addition, a third aspect of the present technique provides a communication system, an information processing method of the communication system, and a program causing a computer to execute the method, the communication system including a first information processing apparatus including a first control unit that transmits an inducement frame for causing another communication device to transmit a transmission suppression period reduction frame for reducing a transmission suppression period, and a second information processing apparatus including a second control unit that transmits the transmission suppression period reduction frame on the basis of the transmitted inducement frame in a case where the second control unit receives the inducement frame. This produces an effect that the first information processing apparatus transmits the inducement frame, and the second information processing apparatus transmits the transmission suppression period reduction frame on the basis of the received inducement frame.

Advantageous Effects of Invention

The present technique can attain excellent advantageous effects of equally reducing transmission suppression periods set in information processing apparatuses to thereby eliminate inequality in using wireless resources. Note that the advantageous effects described here may not be limited, and the present technique may have any of the advantageous effects described in the present disclosure.

DESCRIPTION OF EMBODIMENT

Figure 1:
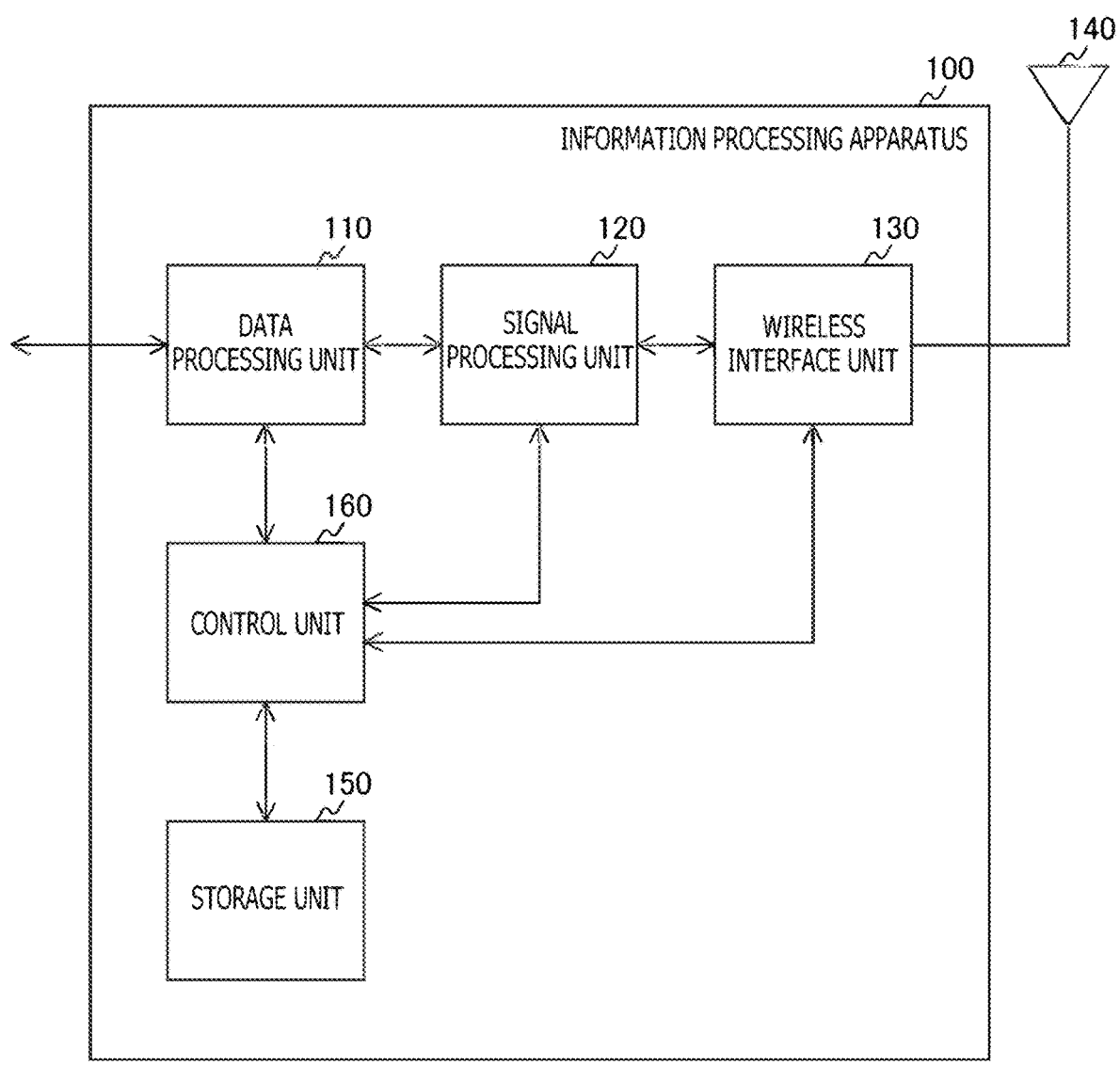
FIG. 1 is a block diagram illustrating a functional configuration example of an information processing apparatus 100 according to an embodiment of the present technique.

Hereinafter, a mode for carrying out the present technique (hereinafter, referred to as embodiment) will be described. The embodiment will be described in the following order.
1. First Embodiment (Example of Case of Transmitting Inducement Frame for Transmitting Transmission Suppression Period Reduction Frame to Another Communication Device)
2. Application Examples 1. Embodiment Functional Configuration Example of Information Processing Apparatus FIG. 1 is a block diagram illustrating a functional configuration example of an information processing apparatus 100 according to an embodiment of the present technique.

The information processing apparatus 100 includes a data processing unit 110, a signal processing unit 120, a wireless interface unit 130, an antenna 140, a storage unit 150, and a control unit 160.

For example, the information processing apparatus 100 can be a fixed or mobile information processing apparatus having a wireless communication function. Here, the fixed information processing apparatus is, for example, an information processing apparatus, such as an access point (Access Point) and a base station, in a wireless LAN (Local Area Network) system. In addition, the mobile information processing apparatus is, for example, an information processing apparatus, such as a smartphone, a mobile phone, and a tablet terminal.

In addition, the information processing apparatus 100 has, for example, a communication function in compliance with a wireless LAN standard of IEEE (Institute of Electrical and Electronic Engineers) 802.11. For example, the information processing apparatus 100 can have a communication function in compliance with a wireless LAN standard of IEEE 802.11ax. In addition, examples of the wireless LAN that can be used include Wi-Fi (Wireless Fidelity), Wi-Fi Direct, Wi-Fi CERTIFIED Miracast specifications (technical specification name: Wi-Fi Display). In addition, other communication systems may be used to perform wireless communication.

In addition, the information processing apparatus 100 may be a device corresponding to, for example, MU-MIMO (Multi User MIMO). In that case, the information processing apparatus 100 can transmit information toward a plurality of devices at the same time. In addition, in the case where the information processing apparatus 100 transmits information toward a plurality of devices at the same time, the information processing apparatus 100 can receive CTS (Clear to Send) frames from a plurality of devices.

The data processing unit 110 is configured to process various types of data on the basis of control of the control unit 160. For example, the data processing unit 110 applies an addition process of a MAC (Media Access Control) Header, an error detection code, or the like to data from an upper layer and generates a packet for wireless transmission. The data processing unit 110 then supplies the generated packet to the signal processing unit 120.

In addition, for example, at reception of data, the data processing unit 110 applies a process of analyzing the header, detecting a packet error, and the like to a bit string received from the signal processing unit 120 and supplies the processed data to the upper layer. In addition, for example, the data processing unit 110 notifies the control unit 160 of an analysis result of the header, a detection result of a packet error, and the like.

The signal processing unit 120 is configured to execute various types of signal processing on the basis of control of the control unit 160. For example, at transmission, the signal processing unit 120 encodes input data from the data processing unit 110 on the basis of a coding and modulation scheme set by the control unit 160 and adds a preamble and a PHY header. The signal processing unit 120 then supplies a transmission symbol stream obtained by the signal processing to the wireless interface unit 130.

In addition, for example, at reception, the signal processing unit 120 detects a preamble and a PHY header of a reception symbol stream received from the wireless interface unit 130, applies a decoding process to the stream, and supplies the data to the data processing unit 110. In addition, for example, the signal processing unit 120 notifies the control unit 160 of a detection result of the PHY header and the like.

The wireless interface unit 130 is an interface for using wireless communication to connect to another information processing apparatus to transmit and receive various types of information on the basis of control of the control unit 160. For example, at transmission, the wireless interface unit 130 converts an input from the signal processing unit 120 into an analog signal, amplifies and filters the signal, up-coverts the signal to a predetermined frequency, and sends out the signal to the antenna 140.

In addition, for example, at reception, the wireless interface unit 130 applies opposite processing to an input from the antenna 140 and supplies the processing result to the signal processing unit 120.

In addition, the transmission power of the data transmitted from the wireless interface unit 130 is controlled by the control unit 160.

The storage unit 150 plays a role of a working area of data processing by the control unit 160 and functions as a storage medium that holds various types of data. For example, a storage medium, such as a non-volatile memory, a magnetic disk, an optical disk, and an MO (Magneto Optical) disk, can be used as the storage unit 150. Note that, for example, an EEPROM (Electrically Erasable Programmable Read-Only Memory) or an EPROM (Erasable Programmable ROM) can be used as the non-volatile memory. In addition, for example, a hard disk or a disc-shaped magnetic disk can be used as the magnetic disk. In addition, for example, a CD (Compact Disc), a DVD-R (Digital Versatile Disc Recordable), or a BD (Blu-ray (registered trademark) Disc) can be used as the optical disk.

The control unit 160 is configured to control respective reception operation and transmission operation of the data processing unit 110, the signal processing unit 120, and the wireless interface unit 130. For example, the control unit 160 transfers information between the components, sets communication parameters, and schedules packets in the data processing unit 110.

In addition, for example, the control unit 160 controls transmission of an inducement frame for causing another communication device to transmit a transmission suppression period reduction (CF_End) frame for reducing a transmission suppression period (NAV (Network Allocation Vector)) that is a period of suppressing frame transmission. That is, the control unit 160 transmits the inducement frame to induce another communication device that receives the frame to transmit a CF_End frame. Details of the configurations of the CF_End frame and the inducement frame will be described later.

In addition, for example, in a case where the control unit 160 receives an inducement frame, the control unit 160 controls transmission of a CF_End frame on the basis of the inducement frame.

Configuration Example of Communication System

Figure 2:
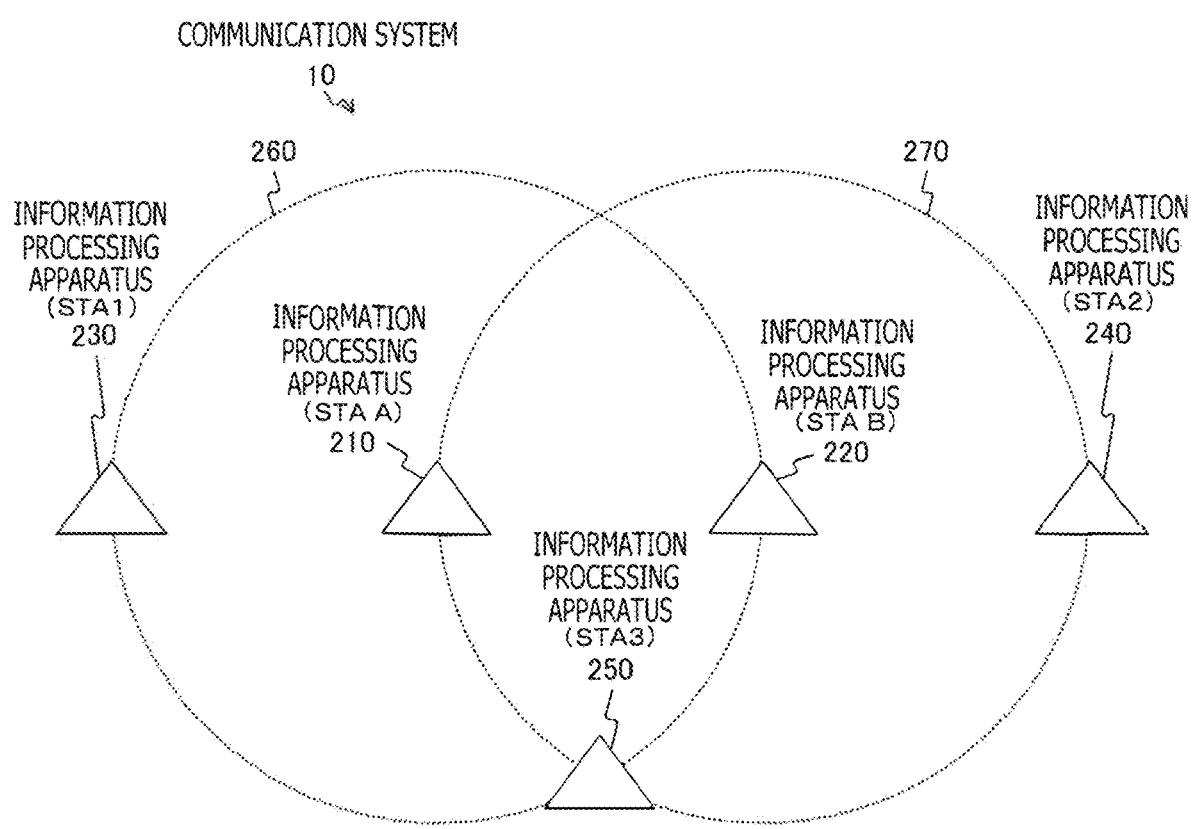
FIG. 2 is a diagram illustrating an example of a system configuration of a communication system 10 according to the embodiment of the present technique.

FIG. 2 is a diagram illustrating an example of a system configuration of a communication system 10 according to the embodiment of the present technique.

The communication system 10 is a wireless network including an information processing apparatus (STA A) 210, an information processing apparatus (STA B) 220, an information processing apparatus (STA1) 230, an information processing apparatus (STA2) 240, and an information processing apparatus (STA3) 250. Note that in FIG. 2, each information processing apparatus (STA) is indicated by a triangle. In addition, a radio wave reaching range 260 of the information processing apparatus (STA A) 210 is indicated by a circle with a dotted line around the information processing apparatus (STA A) 210. In addition, a radio wave reaching range 270 of the information processing apparatus (STA B) 220 is indicated by a circle with a dotted line around the information processing apparatus (STA B) 220.

Here, a hidden terminal generated in an environment including a plurality of different networks will be described with reference to FIG. 2.

For example, a case in which the information processing apparatus (STA A) 210 transmits a frame toward the information processing apparatus (STA B) 220 will be illustrated. In this case, the information processing apparatus (STA2) 240 is outside of the radio wave reaching range 260 of the information processing apparatus (STA A) 210 and cannot detect the frame from the information processing apparatus (STA A) 210. Therefore, there may be a case in which the information processing apparatus (STA2) 240 determines that the radio band is not used and starts frame transmission from the information processing apparatus (STA2) 240. In this case, while the frame is transmitted from the information processing apparatus (STA A) 210, a frame is also transmitted from the information processing apparatus (STA2) 240. In this way, if the frame transmission from the information processing apparatus (STA A) 210 and the frame transmission from the information processing apparatus (STA2) 240 are performed in the same time zone, the frame from the information processing apparatus (STA A) 210 and the frame from the information processing apparatus (STA2) 240 may collide, and the information processing apparatus (STA B) 220 may fail to receive a desired signal.

Figure 3:
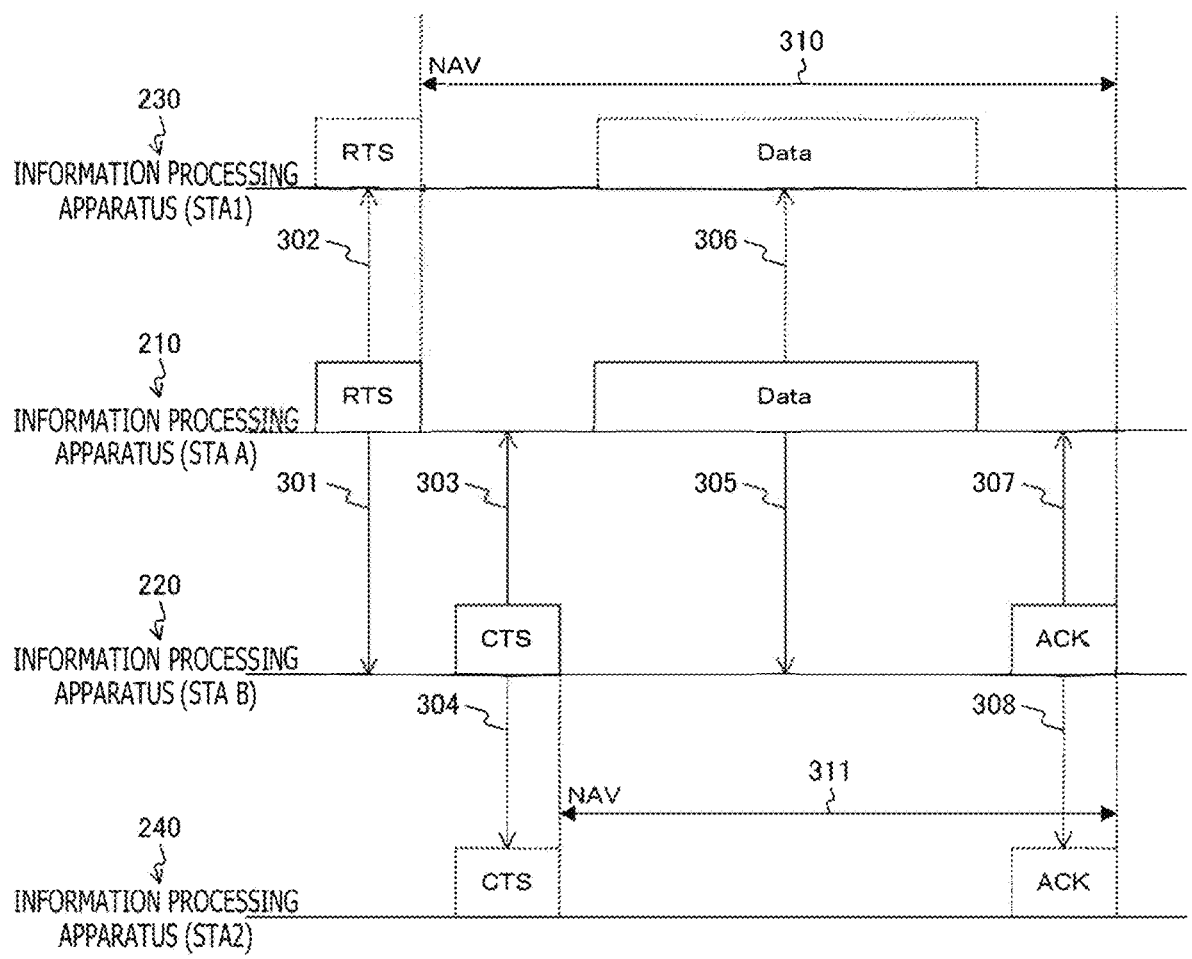
FIG. 3 is a diagram illustrating an example of setting an NAV as a basis of the present technique.

To prevent the failure in the signal reception, a system called NAV is adopted in IEEE 802.11. FIG. 3 illustrates this example.

Example of Setting NAV

FIG. 3 is a diagram illustrating an example of setting the NAV as a basis of the present technique. Note that the horizontal axis illustrated in FIG. 3 indicates a time axis. In addition, above the time axis corresponding to the information processing apparatus (STA A) 210 and the information processing apparatus (STA B) 220 in FIG. 3, data to be transmitted is indicated by rectangles in which the content is written inside. In addition, above the time axis corresponding to the information processing apparatus (STA2) 240, detected data is indicated by rectangles in which the content is written inside.

FIG. 3 illustrates an example of a case in which the NAV is set in the information processing apparatus (STA1) 230 and the information processing apparatus (STA2) 240 individually on the basis of an RST frame and a CTS frame transmitted from the information processing apparatus (STA B) 220.

First, the information processing apparatus (STA A) 210 transmits an RTS frame to the information processing apparatus (STA B) 220 before transmitting the data toward the information processing apparatus (STA B) 220 (301). In the RTS frame, the time (transmission suppression time) for setting the NAV is stored in Duration. In addition, the information processing apparatus (STA A) 210 sets the NAV based on virtual carrier sense throughout the time stored in the Duration of the RTS frame (310).

In addition, in the case where the information processing apparatus (STA B) 220 receives the RTS frame, the information processing apparatus (STA B) 220 transmits a CTS frame to the information processing apparatus (STA A) 210 (303) in response to the RTS frame. The time (transmission suppression time) for setting the NAV is stored in Duration of the CTS frame. In addition, the information processing apparatus (STA B) 220 sets the NAV based on virtual carrier sense throughout the time stored in the Duration of the CTS frame (311).

In this way, the information processing apparatus (STA A) 210 and the information processing apparatus (STA B) 220 exchange the RTS frame and the CTS frame (301 and 303). In addition, the information for the device (peripheral device) that has received each frame to set the transmission suppression period is stored in the RTS frame and the CTS frame.

Here, the information processing apparatus (STA1) 230 can detect the RTS frame transmitted from the information processing apparatus (STA A) 210 (302), and the information processing apparatus (STA1) 230 sets the NAV (310). In addition, the information processing apparatus (STA2) 240 can detect the CTS frame transmitted from the information processing apparatus (STA B) 220 (304), and the information processing apparatus (STA2) 240 sets the NAV (311).

In this way, in the period in which the NAV is set (310 and 311), the information processing apparatus (STA A) 210 transmits data (Data) to the information processing apparatus (STA B) 220 (305). In addition, an acknowledgement (ACK) frame is exchanged as necessary (307).

In addition, the information processing apparatus (STA1) 230 that has received the RTS frame suppresses the transmission from the information processing apparatus (STA1) 230 until the frame exchange between the information processing apparatus (STA A) 210 and the information processing apparatus (STA B) 220 is finished (310). Similarly, the information processing apparatus (STA2) 240 that has received the CTS frame suppresses the transmission from the information processing apparatus (STA2) 240 until the frame exchange between the information processing apparatus (STA A) 210 and the information processing apparatus (STA B) 220 is finished. Therefore, the collision of packets described above can be avoided.

At this time, the time required for the Data transmission changes according to the surrounding environment of the information processing apparatus (STA A) 210. For example, in a case where the information processing apparatus (STA B) 220 is near the information processing apparatus (STA A) 210, the Data can be transmitted at a high MCS (Modulation and Coding Scheme). In such a case, the time required for the Data transmission becomes short, and the NAV is in excess. Therefore, a system of reducing the set NAV is proposed.

(Reduction of Set NAV)

Figure 4:
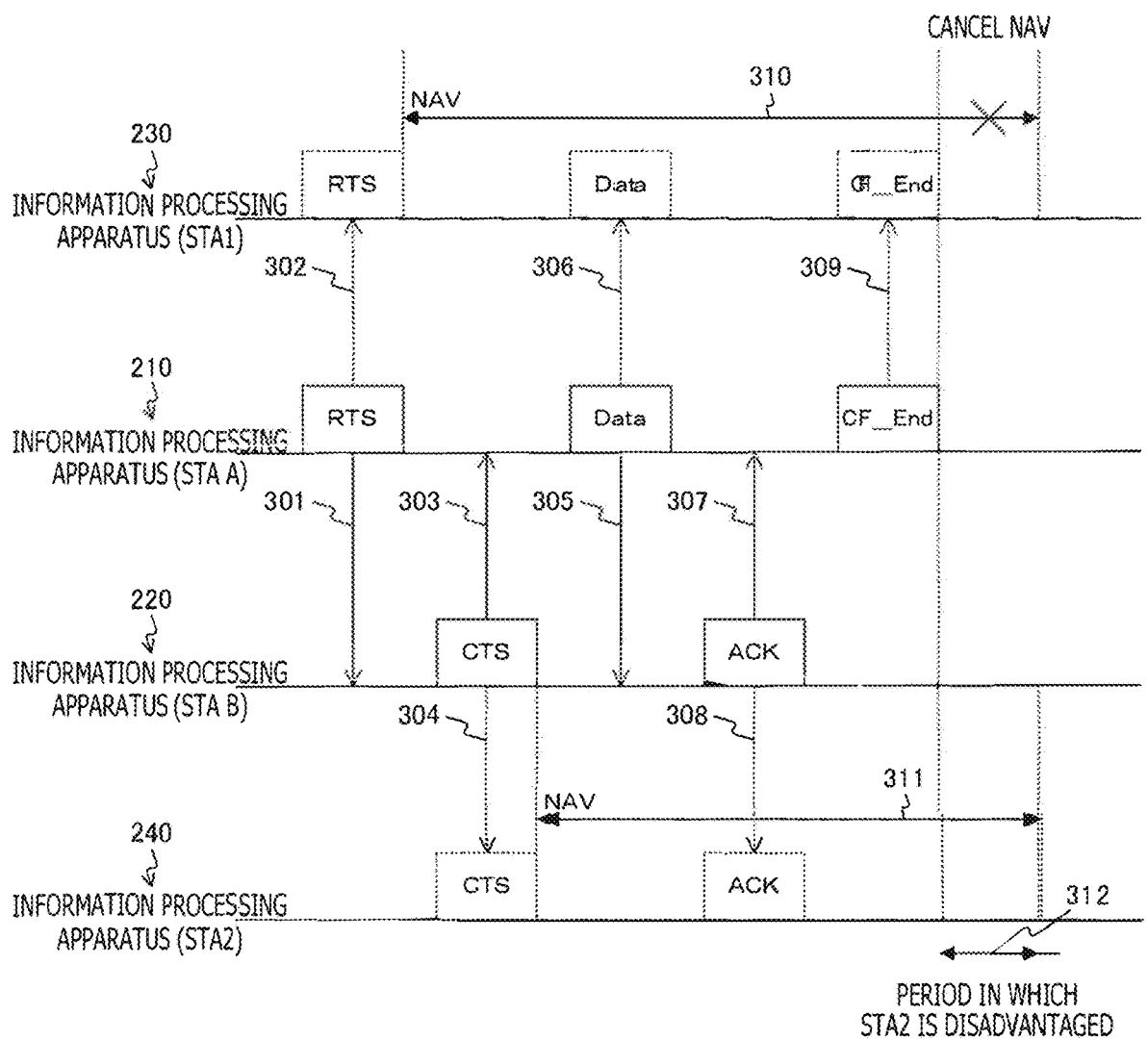
FIG. 4 is a diagram illustrating an example of reducing the set NAV as a basis of the present technique.

FIG. 4 is a diagram illustrating an example of reducing the set NAV as a basis of the present technique. In FIG. 4, after the ACK frame is transmitted from the information processing apparatus (STA B) 220 (307), the information processing apparatus (STA A) 210 can transmit a CF_End frame to surrounding information processing apparatuses to reduce the NAVs set in the information processing apparatuses.

In FIG. 4, the information processing apparatus (STA1) 230 detects the CF_End frame (309) and cancels the NAV (310), and the NAV (310) is reduced. As a result, transmission from the information processing apparatus (STA1) 230 is possible in the subsequent period. In this way, the CF_End frame can be transmitted to effectively use wireless resources.

On the other hand, in FIG. 4, the information processing apparatus (STA2) 240 that cannot receive the CF_End frame from the information processing apparatus (STA A) 210 cannot reduce the set NAV (311). Therefore, the information processing apparatus (STA2) 240 is disadvantaged during a period 312 in FIG. 4 compared to the information processing apparatus (STA1) 230.

In this case, the information processing apparatus (STA B) 220 that has received the CF_End frame can respond to the CF_End frame, and the information processing apparatus (STA B) 220 can reduce the NAV. However, the NAV cannot be reduced at the same time as the information processing apparatus (STA1) 230, and the disadvantage of the information processing apparatus (STA2) 240 is not eliminated.

Therefore, in the embodiment of the present technique, the information processing apparatus (STA A) 210 transmits the inducement frame to induce another information processing apparatus to transmit the CF_End frame. As a result, the CF_End frame is transmitted from a plurality of information processing apparatuses, and the disadvantage described above can be eliminated.

(Reduction of NAV by Transmitting Inducement Frame)

Figure 5:
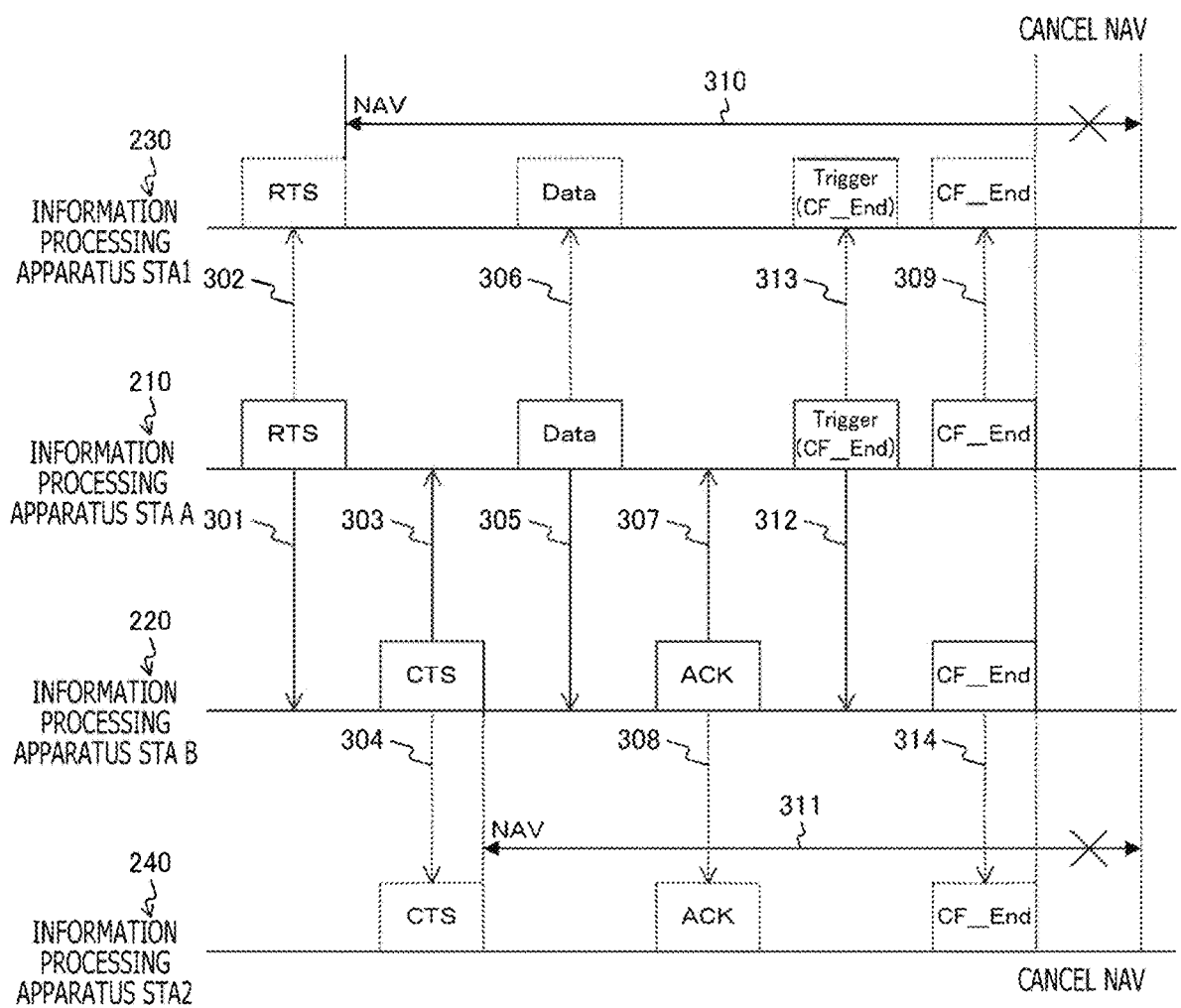
FIG. 5 is a diagram illustrating an example of reducing the NAV by transmitting an inducement frame according to the embodiment of the present technique.

FIG. 5 is a diagram illustrating an example of the reduction of the NAV by transmitting the inducement frame according to the embodiment of the present technique. In FIG. 5, after the ACK is transmitted from the information processing apparatus (STA B) 220 (307), the information processing apparatus (STA A) 210 transmits an inducement frame (Trigger frame) to the information processing apparatus (STA B) 220 (312). The Trigger frame is a frame for inducing the transmission of the CF_End frame. The information processing apparatus (STA B) 220 that has received the Trigger frame transmits a CF_End frame after a predetermined time (314). This can reduce the NAV of an information processing apparatus, specifically, the information processing apparatus (STA2) 240, around the information processing apparatus (STA B) 220.

In this way, in the transmission of the Data frame in which the NAV is set, the information processing apparatus (STA A) 210 that has first transmitted the frame for setting the NAV (transmission 301 and 302 of RTS frame in FIG. 5) transmits the Trigger frame.

In this case, the information processing apparatus (STA1) 210 that has transmitted the Trigger frame can also transmit the CF_End frame after a predetermined time (309). This can reduce the NAV of an information processing apparatus, specifically, the information processing apparatus (STA1) 230, around the information processing apparatus (STA A) 210.

In this case, the information processing apparatus (STA A) 210 and the information processing apparatus (STA B) 220 start to transmit the CF_End frames at the same time (309 and 314). In addition, the CF_End frames are transmitted on the basis of the same transmission rate. Furthermore, the information processing apparatus (STA A) 210 transmits the CF_End frame in the same configuration as the CF_End frame transmitted by the information processing apparatus (STA B) 220. As a result, for example, an information processing apparatus, such as the information processing apparatus (STA3) 250 in FIG. 2, that can receive two CF_End frames transmitted by the information processing apparatus (STA A) 210 and the information processing apparatus (STA B) 220 can receive the CF_End frames as a single CF_End frame.

Note that in the communication of the wireless communication system in compliance with IEEE 802.11, the transmission and the reception of the frames cannot be completely synchronized. It is also difficult to make the transmission rates of a plurality of information processing apparatuses completely equal. Therefore, an error occurs in the timing of the start of the transmission of the CF_End frames by the information processing apparatus (STA A) 210 and the information processing apparatus (STA B) 220 described above. There is also a difference (error) between the transmission rates of the CF_End frames in the information processing apparatus (STA A) 210 and the information processing apparatus (STA B) 220. Even in the case of such an error, a plurality of information processing apparatuses can simultaneously transmit the CF_End frames in the same configuration at the same transmission rate, and another information processing apparatus can receive the CF_End frames as a single CF-End frame.

The information processing apparatus (STA A) 210 can also transmit the Trigger frame to a plurality of information processing apparatuses. The situation will be described with reference to FIG. 6.

Figure 6:
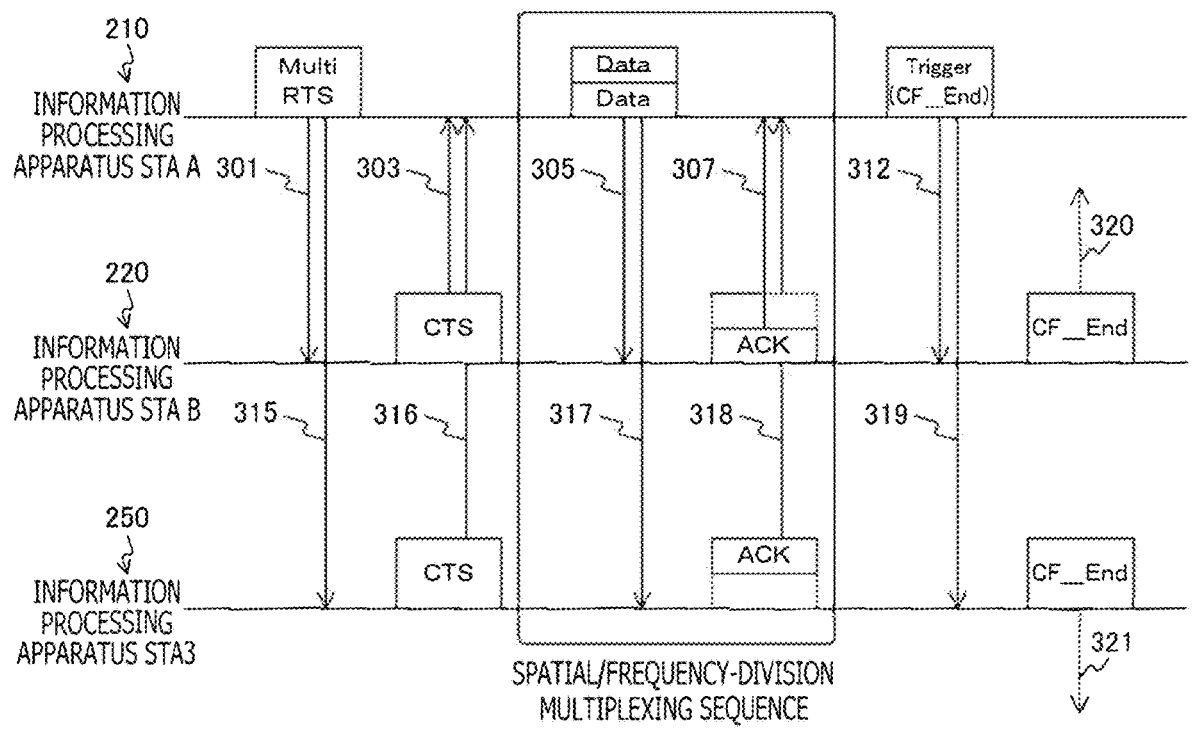
FIG. 6 is a diagram illustrating another example of reducing the NAV by transmitting the inducement frame according to the embodiment of the present technique.

FIG. 6 is a diagram illustrating another example of the reduction of the NAV by transmitting the inducement frame according to the embodiment of the present technique. FIG. 6 depicts a case of a spatial/frequency-division multiplexing sequence in which frames are transmitted to a plurality of information processing apparatuses at the same time.

In FIG. 6, the information processing apparatus (STA A) 210 simultaneously transmits a Multi RTS frame to the information processing apparatus (STA B) 220 and the information processing apparatus (STA3) 250 instead of the RST frame (301 and 315). Next, the information processing apparatus (STA B) 220 and the information processing apparatus (STA3) 250 simultaneously transmit CTS frames to the information processing apparatus (STA A) 210 (303 and 316). Next, the information processing apparatus (STA A) 210 simultaneously transmits a Data frame to the information processing apparatus (STA B) 220 and the information processing apparatus (STA3) 250 (305 and 317). The Data frame is transmitted in a spatial multiplexing or frequency-division multiplexing sequence.

Next, the information processing apparatus (STA B) 220 and the information processing apparatus (STA3) 250 simultaneously transmit ACK frames to the information processing apparatus (STA A) 210 (307 and 318). Different channels are used to transmit the ACK frames. The information processing apparatus (STA A) 210 that has received the ACK frames simultaneously transmits a Trigger frame to the information processing apparatus (STA B) 220 and the information processing apparatus (STA3) 250 (312 and 319). The information processing apparatus (STA B) 220 and the information processing apparatus (STA3) 250 that have received the Trigger frame simultaneously transmit CF_End frames (320 and 321).

In this way, the Trigger frame can be transmitted as an inducement frame to induce a plurality of information processing apparatuses to simultaneously transmit the CF_End frames.

(Configuration of Inducement Frame)

Figure 7:
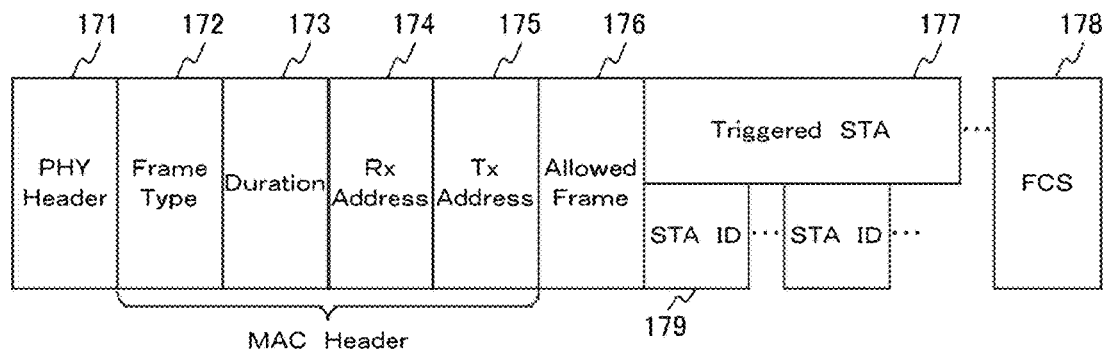
FIG. 7 is a diagram illustrating a configuration example of the inducement frame according to the embodiment of the present technique.

FIG. 7 is a diagram illustrating a configuration example of the inducement frame according to the embodiment of the present technique. FIG. 7 depicts a configuration example of the Trigger frame described in FIG. 6. The Trigger frame in FIG. 7 includes a PHY Header 171, a Frame Type 172, a Duration 173, an Rx Address 174, a Tx Address 175, and an Allowed Frame 176. In addition, the Trigger frame in FIG. 7 further includes a Triggered STA 177 and an FCS 178.

Note that the Frame Type 172, the Duration 173, the Rx Address 174, and the Tx Address 175 form a MAC Header.

Information (Frame Type) indicating the purpose of the transmission of the frame is stored in the MAC Header. Information (UL Trigger) for permitting the target information processing apparatus to communicate in the opposite direction is described in the Trigger frame in FIG. 7.

A BSS (Basic Service Set), a Color, a Length, and the like are stored in the PHY Header 171.

The UL Trigger is described in the Frame Type 172 as described above.

Duration information for setting the NAV is described in the Duration 173.

Address information of the information processing apparatus that should receive the frame is described in the Rx Address 174. A broadcast address for broadcasting can be described as the address information to allow a plurality of information processing apparatuses to receive the Trigger frame. That is, the broadcast address is described in the Rx Address 174 of the Trigger frame described in FIG. 6.

Address information of the information processing apparatus as a sender of the frame is described in the Tx Address 175.

The type of the frame to be transmitted in the opposite direction is described in the Allowed Frame 176. The CF_End frame is designated in the Trigger frame of FIG. 7.

Addresses (STA ID) 179 of the information processing apparatuses that transmit the frames in the opposite direction are described in the Triggered STA 177. In FIG. 6, the addresses of the information processing apparatus (STA B) 220 and the information processing apparatus (STA3) 250 are described.

An error detection code is stored in the FCS 178.

Note that the information is an example, and other information may be stored in the frame.

(Configuration of Transmission Suppression Period Reduction Frame)

Figure 8:
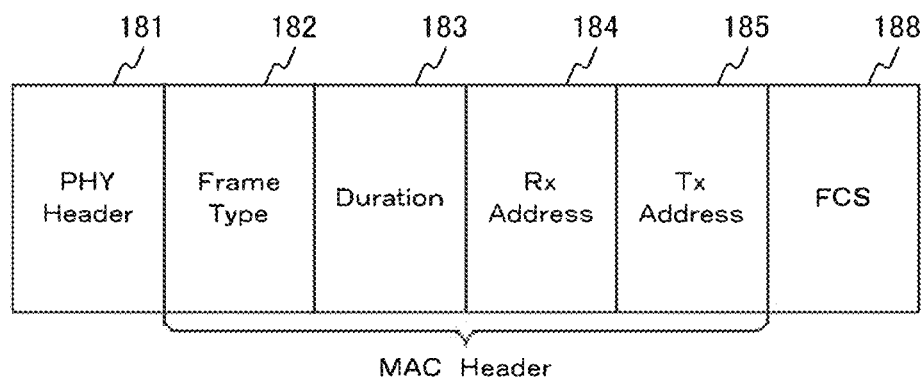
FIG. 8 is a diagram illustrating a configuration example of a transmission suppression period reduction frame according to the embodiment of the present technique.

FIG. 8 is a diagram illustrating a configuration example of the transmission suppression period reduction frame according to the embodiment of the present technique. FIG. 8 depicts a configuration example of the CF_End frame described in FIG. 5. The CF_End frame of FIG. 8 includes a PHY Header 181, a Frame Type 182, a Duration 183, an Rx address 184, a Tx Address 185, and an FCS 188.

Note that the Frame Type 182, the Duration 183, the Rx Address 184, and the Tx address 185 form a MAC Header.

The Frame Type 182 indicates that the frame is a CF_End frame.

A value "0" is described in the Duration 183.

A broadcast address is described in the Rx Address 184.

The address of the information processing apparatus that has transmitted the Trigger frame is described in the Tx Address 185, for example. This is for causing a plurality of information processing apparatuses to transmit CF_End frames with the same content. This can be defined by, for example, a standard.

The PHY Header 181 and the FCS 188 are similar to the PHY Header 171 and the FCS 178 described in FIG. 7, and the description will not be repeated.

(Data Transmission Process)

Figure 9:
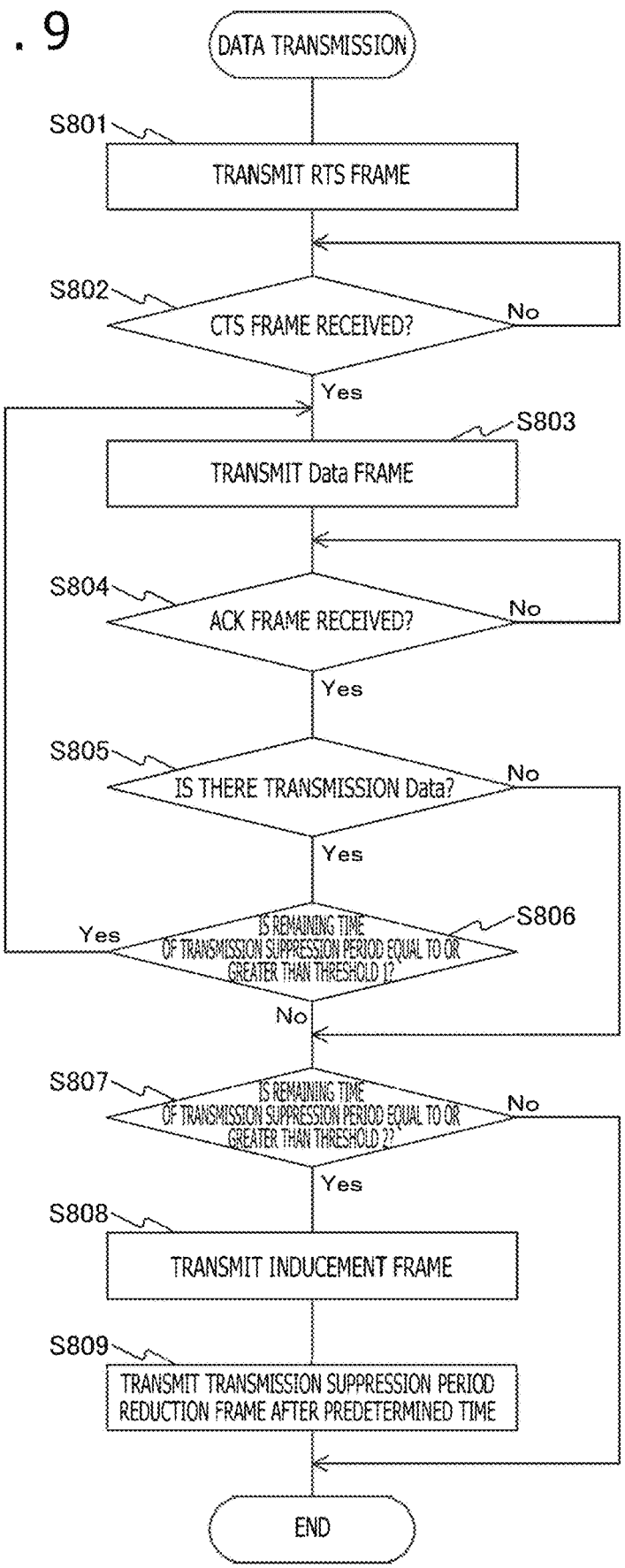
FIG. 9 is a diagram illustrating an example of a processing procedure of a data transmission process according to the embodiment of the present technique.

FIG. 9 is a diagram illustrating an example of a processing procedure of a data transmission process according to the embodiment of the present technique. The process of FIG. 9 is a process executed when the information processing apparatus transmits data. Specifically, the information processing apparatus (STA A) 210 described in FIG. 5 executes the process.

First, the control unit 160 transmits an RTS frame (step S801). As a result, a transmission suppression period (310 in FIG. 5) is set. Next, the control unit 160 waits until the control unit 160 receives a CTS frame (step S802). If the control unit 160 receives a CTS frame (step S802: Yes), the control unit 160 transmits a Data frame (step S803). Next, the control unit 160 waits until the control unit 160 receives an ACK frame (step S804). If the control unit 160 receives an ACK frame (step S804: Yes), the control unit 160 determines whether or not there is transmission Data (step S805). This can be determined on the basis of, for example, whether or not there is Data to be further transmitted to a transmission buffer.

If there is transmission Data (step S805: Yes), the control unit 160 determines whether or not the remaining time of the transmission suppression period is equal to or greater than a threshold 1 (step S806). Here, the threshold 1 is a threshold of the remaining time for determining whether or not a Data frame and an ACK frame can be transmitted and received. If the remaining time is equal to or greater than the threshold 1 (step S806: Yes), the control unit 160 executes the process from step S803 again. If the remaining time is smaller than the threshold 1 (step S806: No), the control unit 160 moves to a process of step S807. On the other hand, if there is no transmission Data in step S805 (step S805: No), the control unit 160 moves to the process of step S807.

In step S807, the control unit 160 determines whether or not the remaining time of the transmission suppression period is equal to or greater than a threshold 2 (step S807). Here, the threshold 2 is a threshold of the remaining time for determining whether or not an inducement frame and a transmission suppression period reduction frame can be transmitted. If the remaining time is equal to or greater than the threshold 2 (step S807: Yes), the control unit 160 transmits an inducement frame (step S808). Specifically, the control unit 160 transmits the Trigger frame described in FIG. 7. Next, the control unit 160 transmits a transmission suppression period reduction frame after a predetermined time (step S809). Specifically, the control unit 160 transmits a CF_End frame described in FIG. 8. Here, the predetermined time can be a time determined by a standard. Subsequently, the control unit 160 ends the data transmission process.

On the other hand, if the remaining time of the transmission suppression period is smaller than the threshold 2 in step S807 (step S807: No), the control unit 160 skips the process of steps S808 and S809 and ends the data transmission process.

(Response Process)

Figure 10:
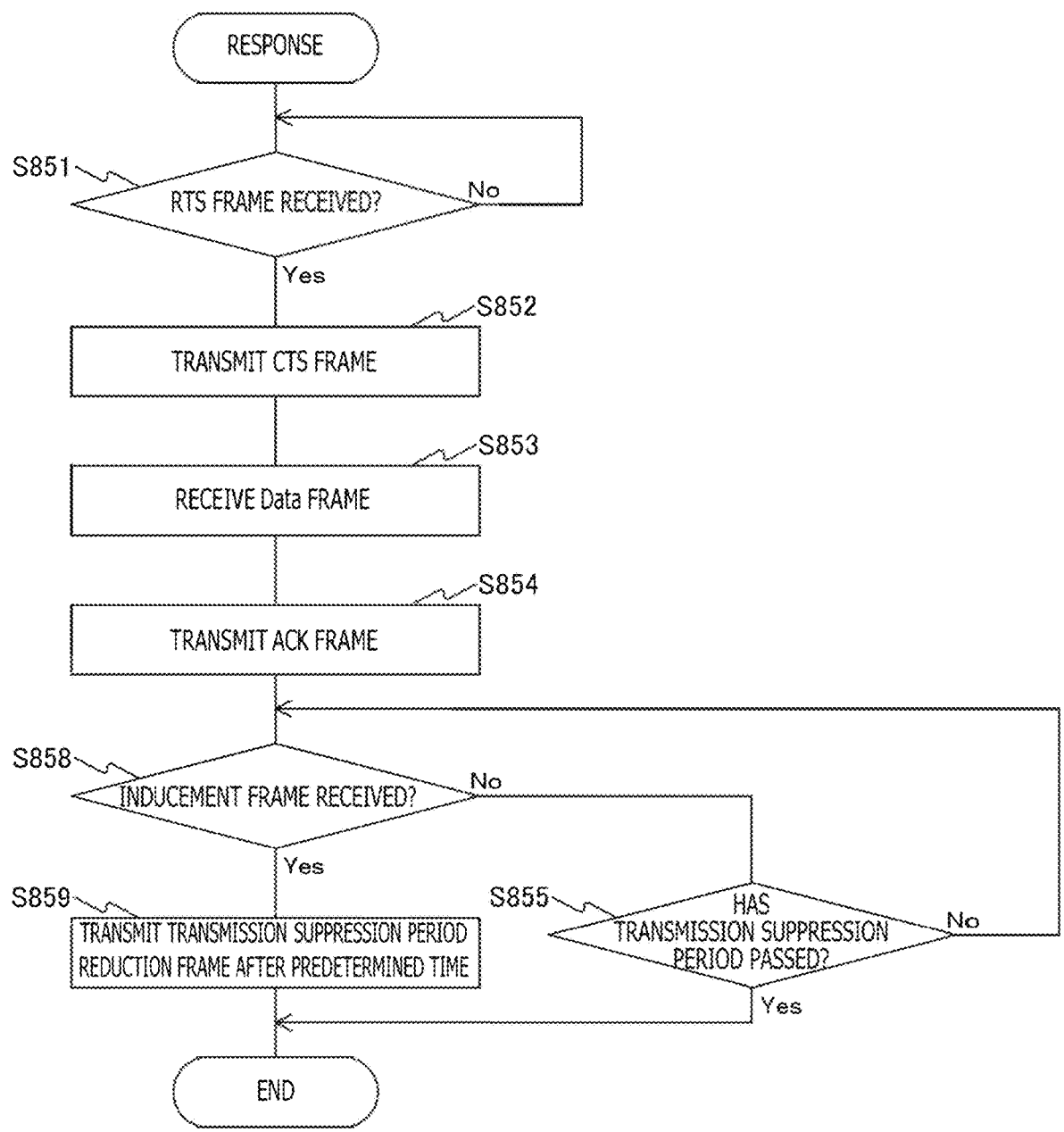
FIG. 10 is a diagram illustrating an example of a processing procedure of a response process according to the embodiment of the present technique.

FIG. 10 is a diagram illustrating an example of a processing procedure of a response process according to the embodiment of the present technique. The process of FIG. 10 is a process executed by an information processing apparatus that has received an RTS frame. Specifically, the information processing apparatus (STA B) 220 described in FIG. 5 executes the process.

First, the control unit 160 waits until the control unit 160 receives an RTS frame (step S851). If the control unit 160 receives an RTS frame (step S851: Yes), the control unit 160 transmits a CTS frame (step S852). As a result, a transmission suppression period (311 in FIG. 5) is set.

Subsequently, the control unit 160 receives a Data frame (step S853). Next, the control unit 160 transmits an ACK frame (step S854). Next, the control unit 160 determines whether or not the control unit 160 has received an inducement frame (Trigger frame) (step S858). If the control unit 160 has received an inducement frame (step S858: Yes), the control unit 160 transmits a transmission suppression period reduction frame (CF_End frame) after a predetermined time (step S859) and ends the response process.

In this way, the information processing apparatus can transmit the CF_End frame in a case where the information processing apparatus receives a Trigger frame from another communication device that has transmitted a frame (RTS frame) for setting the NAV.

On the other hand, if the control unit 160 has not received an inducement frame in step S858 (step S858: No), the control unit 160 determines whether or not a transmission suppression period has passed (step S855). If the transmission suppression period has not passed (step S855: No), the control unit 160 executes the process from step S858 again. If the transmission suppression period has passed (step S855: Yes), the control unit 160 ends the response process.

In this way, according to the embodiment of the present technique, the inducement frame can be transmitted to cause another information processing apparatus to transmit the transmission suppression period reduction frame, and the set NAVs can be reduced substantially at the same time. As a result, the transmission suppression periods set in other information processing apparatuses can be equally reduced, and the inequality in using the wireless resources can be eliminated.

2. Application Example

The technique according to the present disclosure can be applied to various products. For example, the information processing apparatus 100 may be realized as a mobile terminal, such as a smartphone, a tablet PC (Personal Computer), a notebook PC, a mobile game terminal, and a digital camera, a fixed terminal, such as a television receiver, a printer, a digital scanner, and a network storage, or an in-vehicle terminal, such as a car navigation apparatus. The information processing apparatus 100 may also be realized as a terminal (also called MTC (Machine Type Communication) terminal) that performs M2M (Machine To Machine) communication, such as a smart meter, a vending machine, a remote monitoring apparatus, and a POS (Point Of Sale) terminal. The information processing apparatus 100 may also be a wireless communication module mounted on these terminals (for example, integrated circuit module including one die).

On the other hand, the information processing apparatus 100 may be realized as, for example, a wireless LAN access point (also called wireless base station) with a router function or without a router function. The information processing apparatus 100 and each information processing apparatus (STA) may also be realized as a mobile wireless LAN router. The information processing apparatus 100 may also be a wireless communication module mounted on these apparatuses (for example, integrated circuit module including one die).

2-1. First Application Example

Figure 11:
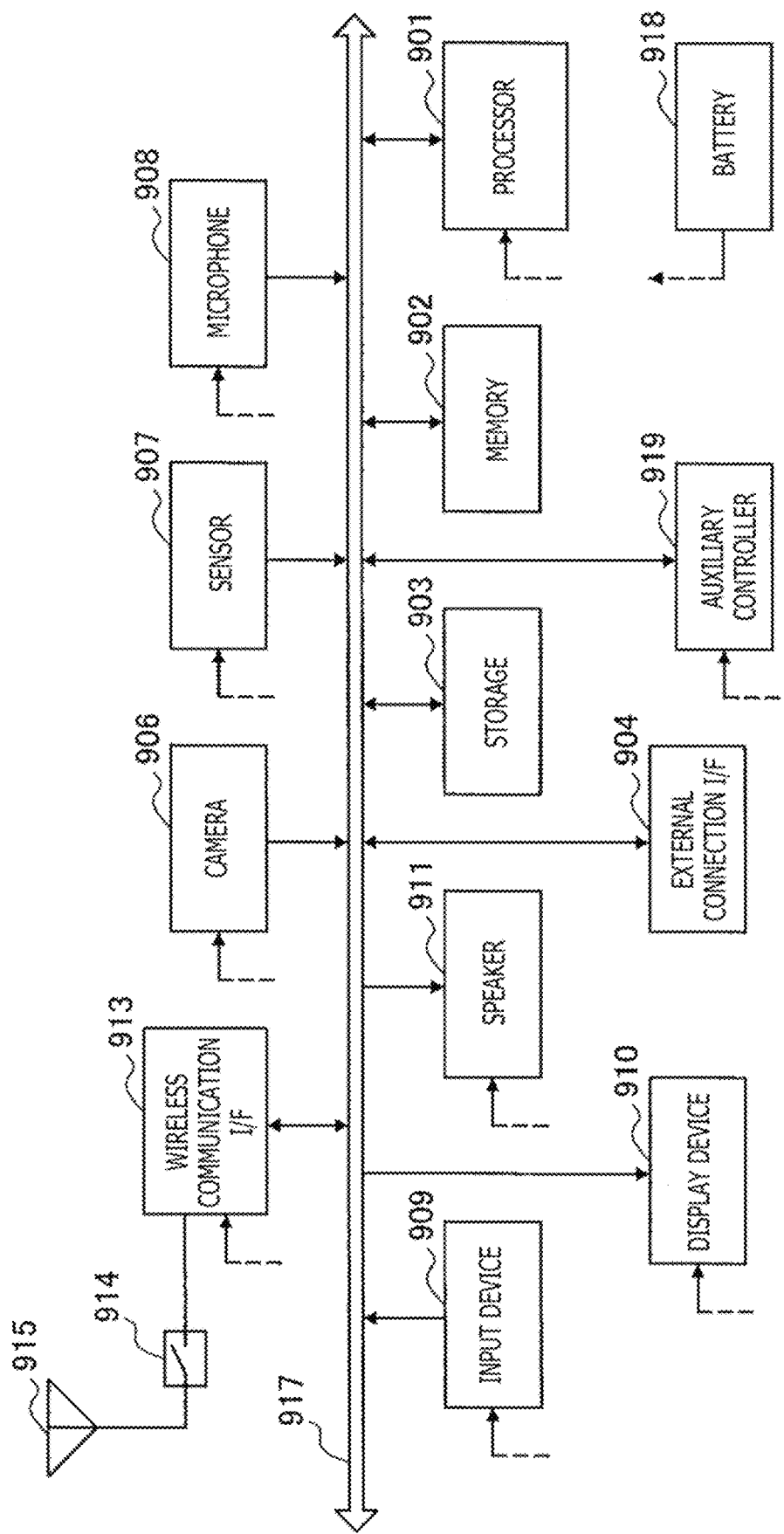
FIG. 11 is a block diagram illustrating an example of a schematic configuration of a smartphone 900 to which the technique according to the present disclosure can be applied.

FIG. 11 is a block diagram illustrating an example of a schematic configuration of a smartphone 900 to which the technique according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or a SoC (System on Chip), and the processor 901 controls functions of an application layer and other layers of the smartphone 900. The memory 902 includes a RAM (Random Access Memory) and a ROM (Read Only Memory) and stores programs and data executed by the processor 901. The storage 903 can include a storage medium, such as a semiconductor memory and a hard disk. The external connection interface 904 is an interface for connecting an external device, such as a memory card and a USB (Universal Serial Bus) device, to the smartphone 900.

The camera 906 includes, for example, an imaging element, such as a CCD (Charge Coupled Device) and a CMOS (Complementary Metal Oxide Semiconductor), and generates a captured image. The sensor 907 can include, for example, a sensor group, such as a positioning sensor, a gyrosensor, a geomagnetic sensor, and an acceleration sensor. The microphone 908 converts sound input to the smartphone 900 into a sound signal. The input device 909 includes, for example, a touch sensor that detects a touch on a screen of the display device 910, a key pad, a keyboard, a button, a switch, or the like and receives an operation or an input of information from the user. The display device 910 includes a screen, such as a liquid crystal display (LCD) and an organic light-emitting diode (OLED) display, and displays an output image of the smartphone 900. The speaker 911 converts a sound signal output from the smartphone 900 into sound.

The wireless communication interface 913 supports one or more wireless LAN standards, such as IEEE 802.11a, 11b, 11g, 11n, 11ac, and 11ad, and executes wireless communication. The wireless communication interface 913 can communicate with another apparatus through a wireless LAN access point in an infrastructure mode. Furthermore, the wireless communication interface 913 can directly communicate with another apparatus in a direct communication mode, such as an ad hoc mode and Wi-Fi Direct. Note that although one of two terminals operates as an access point in the Wi-Fi Direct unlike in the ad hoc mode, the terminals directly communicate with each other. The wireless communication interface 913 can typically include a baseband processor, an RF (Radio Frequency) circuit, a power amplifier, and the like. The wireless communication interface 913 may be a one-chip module in which a memory that stores a communication control program, a processor that executes the program, and related circuits are integrated. The wireless communication interface 913 may support other types of wireless communication systems, such as a short-range wireless communication system, a near-field wireless communication system, and a cellular communication system, in addition to the wireless LAN system. The antenna switch 914 switches destinations of the antenna 915 between a plurality of circuits (for example, circuits for different wireless communication systems) included in the wireless communication interface 913. The antenna 915 includes a single or a plurality of antenna elements (for example, a plurality of antenna elements included in a MIMO antenna), and the antenna 915 is used for transmission and reception of radio signals through the wireless communication interface 913.

Note that the smartphone 900 is not limited to the example of FIG. 11, and the smartphone 900 may include a plurality of antennas (for example, an antenna for wireless LAN, an antenna for near-field wireless communication system, and the like). In that case, the antenna switch 914 may be excluded from the configuration of the smartphone 900.

The bus 917 mutually connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919. The battery 918 supplies power to each block of the smartphone 900 illustrated in FIG. 11 through power feed lines partially indicated by dotted lines in FIG. 11. The auxiliary controller 919 causes the smartphone 900 to operate minimum required functions in a sleep mode, for example.

In the smartphone 900 illustrated in FIG. 11, the control unit 160 described with reference to FIG. 1 may be implemented in the wireless communication interface 913. In addition, at least some of the functions may be implemented in the processor 901 or the auxiliary controller 919. For example, the control unit 160 can transmit the inducement frame to improve the use efficiency of the wireless resources, and the power consumption of the battery 918 can be reduced.

Note that the processor 901 may execute an access point function in an application level, and the smartphone 900 may operate as a wireless access point (software AP). In addition, the wireless communication interface 913 may have a wireless access point function.

2-2. Second Application Example

Figure 12:
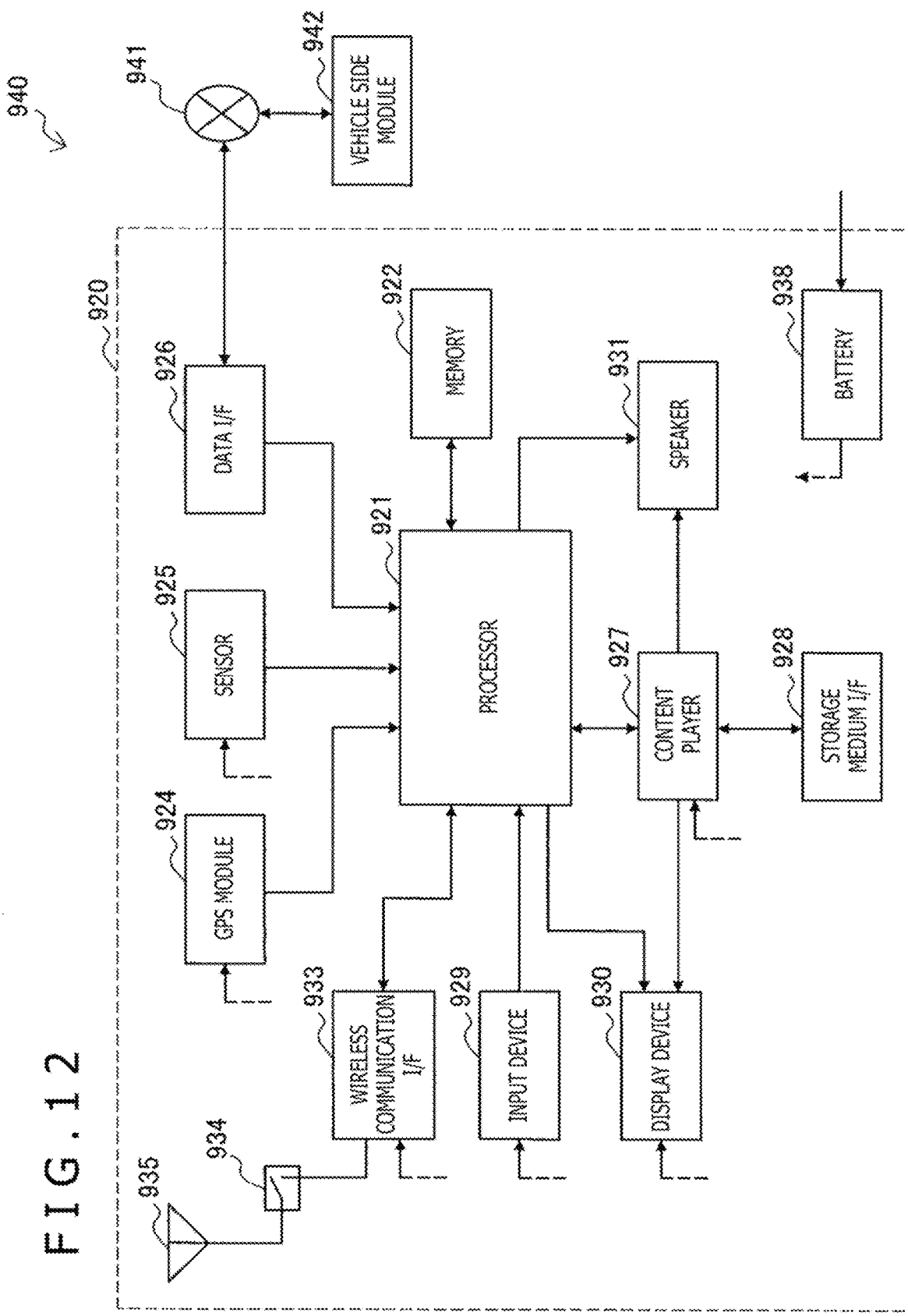
FIG. 12 is a block diagram illustrating an example of a schematic configuration of a car navigation apparatus 920 to which the technique according to the present disclosure can be applied.

FIG. 12 is a block diagram illustrating an example of a schematic configuration of a car navigation apparatus 920 to which the technique according to the present disclosure can be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and the processor 921 controls a navigation function and other functions of the car navigation apparatus 920. The memory 922 includes a RAM and a ROM and stores programs and data executed by the processor 921.

The GPS module 924 uses a GPS signal received from a GPS satellite to measure the position (for example, latitude, longitude, and altitude) of the car navigation apparatus 920. The sensor 925 can include, for example, a sensor group, such as a gyrosensor, a geomagnetic sensor, and a pressure sensor. The data interface 926 is connected to an in-vehicle network 941 through, for example, a terminal not illustrated, and the data interface 926 acquires data, such as vehicle speed data, generated on the vehicle side.

The content player 927 reproduces content stored in a storage medium (for example, a CD or a DVD) inserted to the storage medium interface 928. The input device 929 includes, for example, a touch sensor that detects a touch on a screen of the display device 930, a button, a switch, or the like and receives an operation or an input of information from the user. The display device 930 includes a screen, such as an LCD and an OLED display, and displays an image of the navigation function or the content to be reproduced. The speaker 931 outputs sound of the navigation function or the content to be reproduced.

The wireless communication interface 933 supports one or more wireless LAN standards, such as IEEE 802.11a, 11b, 11g, 11n, 11ac, and 11ad, and executes wireless communication. The wireless communication interface 933 can communicate with another apparatus through a wireless LAN access point in an infrastructure mode. In addition, the wireless communication interface 933 can directly communicate with another apparatus in a direct communication mode, such as an ad hoc mode and Wi-Fi Direct. The wireless communication interface 933 can typically include a baseband processor, an RF circuit, a power amplifier, and the like. The wireless communication interface 933 may be a one-chip module in which a memory that stores a communication control program, a processor that executes the program, and related circuits are integrated. The wireless communication interface 933 may support other types of wireless communication systems, such as a short-range wireless communication system, a near-field wireless communication system, and a cellular communication system, in addition to the wireless LAN system. The antenna switch 934 switches destinations of the antenna 935 between a plurality of circuits included in the wireless communication interface 933. The antenna 935 includes a single or a plurality of antenna elements, and the antenna 935 is used for transmission and reception of radio signals through the wireless communication interface 933.

Note that the car navigation apparatus 920 is not limited to the example of FIG. 12, and the car navigation apparatus 920 may include a plurality of antennas. In that case, the antenna switch 934 may be excluded from the configuration of the car navigation apparatus 920.

The battery 938 supplies power to each block of the car navigation apparatus 920 illustrated in FIG. 12 through power lines partially indicated by dotted lines in FIG. 12. The battery 938 also accumulates power fed from the vehicle side.

In the car navigation apparatus 920 illustrated in FIG. 12, the control unit 160 described with reference to FIG. 1 may be implemented in the wireless communication interface 933. In addition, at least some of the functions may be implemented in the processor 921. For example, the car navigation apparatus 920 can transmit the inducement frame to improve the use efficiency of the wireless resources.

In addition, the wireless communication interface 933 may operate as the information processing apparatus 100 to provide wireless connection to the terminal possessed by the user riding on the vehicle.

In addition, the technique according to the present disclosure may be realized as an in-vehicle system (or vehicle) 940 including one or more blocks of the car navigation apparatus 920 described above, the in-vehicle network 941, and a vehicle side module 942. The vehicle side module 942 generates vehicle side data, such as vehicle speed, engine speed, and malfunction information, and outputs the generated data to the in-vehicle network 941.

2-3. Third Application Example

Figure 13:
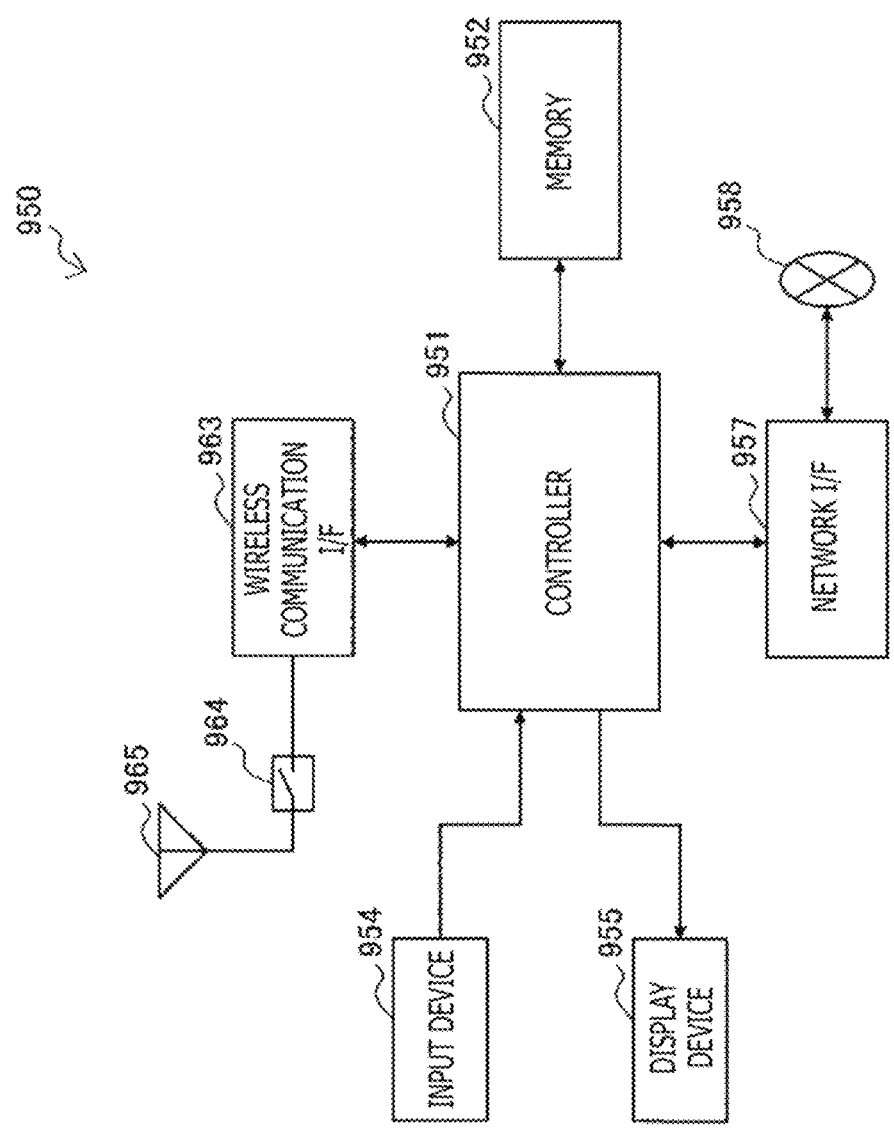
FIG. 13 is a block diagram illustrating an example of a schematic configuration of a wireless access point 950 to which the technique according to the present disclosure can be applied.

FIG. 13 is a block diagram illustrating an example of a schematic configuration of a wireless access point 950 to which the technique according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a DSP (Digital Signal Processor), and the controller 951 operates various functions (for example, access restriction, routing, encryption, firewall, log management, and the like) of layers higher than an IP (Internet Protocol) layer of the wireless access point 950. The memory 952 includes a RAM and a ROM and stores programs executed by the controller 951 and various control data (for example, terminal list, routing table, encryption key, security setting, log, and the like).

The input device 954 includes, for example, a button, a switch, or the like and receives an operation from the user. The display device 955 includes an LED lamp or the like and displays the operation status of the wireless access point 950.

The network interface 957 is a wired communication interface for connection of the wireless access point 950 to a wired communication network 958. The network interface 957 may include a plurality of connection terminals. The wired communication network 958 may be a LAN, such as Ethernet (registered trademark), or may be a WAN (Wide Area Network).

The wireless communication interface 963 supports one or more wireless LAN standards, such as IEEE 802.11a, 11b, 11g, 11n, 11ac, and 11ad, and serves as an access point to provide wireless connection to neighboring terminals. The wireless communication interface 963 can typically include a baseband processor, an RF circuit, a power amplifier, and the like. The wireless communication interface 963 may be a one-chip module in which a memory that stores a communication control program, a processor that executes the program, and related circuits are integrated. The antenna switch 964 switches destinations of the antenna 965 between a plurality of circuits included in the wireless communication interface 963. The antenna 965 includes a single or a plurality of antenna elements, and the antenna 965 is used for transmission and reception of radio signals through the wireless communication interface 963.

In the wireless access point 950 illustrated in FIG. 13, the control unit 160 described with reference to FIG. 1 may be implemented in the wireless communication interface 963. In addition, at least some of the functions may be implemented in the controller 951. For example, the wireless access point 950 can transmit the inducement frame to improve the use efficiency of the wireless resources.

Note that the embodiment described above illustrates an example for embodying the present technique, and the matters in the embodiment and the matters used to specify the invention in the claims correspond to each other. Similarly, the matters used to specify the invention in the claims and the matters with the same names in the embodiment of the present technique correspond to each other. However, the present technique is not limited to the embodiment, and the present technique can be embodied by applying various modifications to the embodiment without departing from the scope of the present technique.

In addition, the processing procedures described in the embodiment may be regarded as a method including the series of procedures, and the processing procedures may be regarded as a program for causing a computer to execute the series of procedures or as a recording medium storing the program. Examples of the recording medium that can be used include a CD (Compact Disc), an MD (MiniDisc), a DVD (Digital Versatile Disc), a memory card, and a Blu-ray (registered trademark) Disc.

Note that the advantageous effects described in the present specification are illustrative only, and the advantageous effects are not limited. There may also be other advantageous effects.

Note that the present technique can also be configured as follows.

(1)

An information processing apparatus including:

a control unit that transmits an inducement frame for causing another communication device to transmit a transmission suppression period reduction frame for reducing a transmission suppression period.

(2)

The information processing apparatus according to (1), in which the control unit transmits the transmission suppression period reduction frame to another communication device after the transmission of the inducement frame.

(3)

The information processing apparatus according to (2), in which the control unit transmits the transmission suppression period reduction frame in the same configuration as the transmission suppression period reduction frame transmitted after the inducement by the transmitted inducement frame.

(4)

The information processing apparatus according to (2) or (3), in which the control unit transmits the transmission suppression period reduction frame at the same time as the transmission suppression period reduction frame transmitted after the inducement by the transmitted inducement frame.

(5)

The information processing apparatus according to any one of (2) to (4), in which the control unit transmits the transmission suppression period reduction frame on the basis of the same transmission rate as the transmission suppression period reduction frame transmitted after the inducement by the transmitted inducement frame.

(6)

The information processing apparatus according to any one of (1) to (5), in which the control unit broadcasts the inducement frame to a plurality of other information processing apparatuses.

(7)

The information processing apparatus according to any one of (1) to (6), in which the control unit transmits the inducement frame in a case where the control unit first transmits a frame for setting the transmission suppression period in transmission of data in the transmission suppression period.

(8)

The information processing apparatus according to any one of (1) to (7), in which the control unit controls the transmission by adding information included in a trigger frame to the inducement frame.

(9)

An information processing apparatus including:

a control unit that transmits a transmission suppression period reduction frame for reducing a transmission suppression period on the basis of an inducement frame for inducing transmission of the transmission suppression period reduction frame in a case where the control unit receives the inducement frame.

(10)

The information processing apparatus according to (9), in which the control unit transmits the transmission suppression period reduction frame in a case where the control unit receives the inducement frame from another communication device that has transmitted a frame for setting the transmission suppression period.

(11)

The information processing apparatus according to (9) or (10), in which the control unit transmits the transmission suppression period reduction frame in a case where the control unit receives the inducement frame including information included in a trigger frame.

(12)

A communication system including:

a first information processing apparatus including a first control unit that transmits an inducement frame for causing another communication device to transmit a transmission suppression period reduction frame for reducing a transmission suppression period; and a second information processing apparatus including a second control unit that transmits the transmission suppression period reduction frame on the basis of the transmitted inducement frame in a case where the second control unit receives the inducement frame.

(13)

An information processing method including:

a control procedure of transmitting an inducement frame for causing another communication device to transmit a transmission suppression period reduction frame for reducing a transmission suppression period.

(14)

An information processing method including:

a control procedure of transmitting a transmission suppression period reduction frame for reducing a transmission suppression period on the basis of an inducement frame for inducing transmission of the transmission suppression period reduction frame in a case where the inducement frame is received.

(15)

A program causing a computer to execute:

a control procedure of transmitting an inducement frame for causing another communication device to transmit a transmission suppression period reduction frame for reducing a transmission suppression period.

(16)

A program causing a computer to execute:

a control procedure of transmitting a transmission suppression period reduction frame for reducing a transmission suppression period on the basis of an inducement frame for inducing transmission of the transmission suppression period reduction frame in a case where the inducement frame is received.

Reference Signs List

10 Communication system
100, 210, 220, 230, 240, 250 Information processing apparatus
110 Data processing unit
120 Signal processing unit
130 Wireless interface unit
140 Antenna
150 Storage unit
160 Control unit
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing device comprising:
circuitry configured to
transmit an inducement frame for causing a first communication device to transmit a first CF-End frame for reducing a Network Allocation Vector; and
transmit a second CF-End frame to a second communication device after the transmission of the inducement frame,
wherein the second CF-End frame is transmitted at a same time as the first CF-End frame, the first CF-End frame and the second CF-End frame being transmitted a predetermined time after an inducement by the transmitted inducement frame.

2. The information processing device according to claim 1, wherein
the circuitry is further configured to transmit the second CF-End frame in a same configuration as the first CF-End frame transmitted after the inducement by the transmitted inducement frame.

3. The information processing device according to claim 1, wherein
the circuitry is further configured to transmit the second CF-End frame on a basis of a same transmission rate as the first CF-End frame.

4. The information processing device according to claim 1, wherein
the circuitry is further configured to broadcast the inducement frame to a plurality of other information processing devices.

5. The information processing device according to claim 1, wherein
the circuitry is further configured to transmit the inducement frame in a case where the circuitry first transmits a frame for setting the Network Allocation Vector in transmission of data during the Network Allocation Vector.

6. The information processing device according to claim 1, wherein
the circuitry is further configured to control transmission by adding information included in a trigger frame to the inducement frame.

7. An information processing device comprising:
circuitry configured to
transmit a first CF-End frame for reducing a Network Allocation Vector on a basis of an inducement frame for inducing transmission of the first CF-End frame in a case where the circuitry receives the inducement frame,
wherein the first CF-End frame is transmitted at a same time as a second CF-End frame transmitted by another information processing device, the first CF-End frame and the second CF-End frame being transmitted a predetermined time after an inducement by the received inducement frame.

8. The information processing device according to claim 7, wherein
the circuitry is further configured to transmit the first CF-End frame in a case where the circuitry receives the inducement frame from a communication device that has transmitted a frame for setting the Network Allocation Vector.

9. The information processing device according to claim 7, wherein
the circuitry is further configured to transmit the first CF-End frame in a case where the circuitry receives the inducement frame including information included in a trigger frame.

10. An information processing method executed in an information processing device comprising:
transmitting an inducement frame for causing a first communication device to transmit a first CF-End frame for reducing a Network Allocation Vector; and
transmitting a second CF-End frame to a second communication device at a same time as the first CF-End frame, the first CF-End frame and the second CF-End frame being transmitted a predetermined time after an inducement by the transmitted inducement frame.

11. An information processing method executed in an information processing device comprising:
transmitting a CF-End frame for reducing a Network Allocation Vector on a basis of an inducement frame for inducing transmission of the first CF-End frame in a case where the inducement frame is received,
wherein the first CF-End frame is transmitted at a same time as a second CF-End frame transmitted by another information processing device, the first CF-End frame and the second CF-End frame being transmitted a predetermined time after an inducement by the received inducement frame.

* * * * *